Haberbush & Kreckel,
Safety Bridle,
Nº 59,996. Patented Nov. 27, 1866.
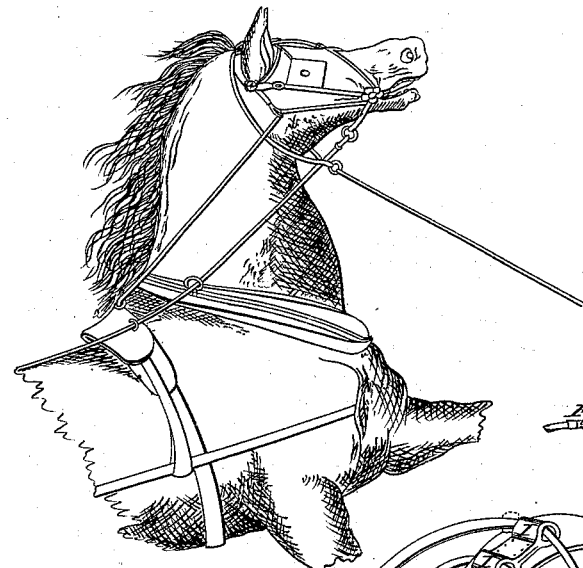
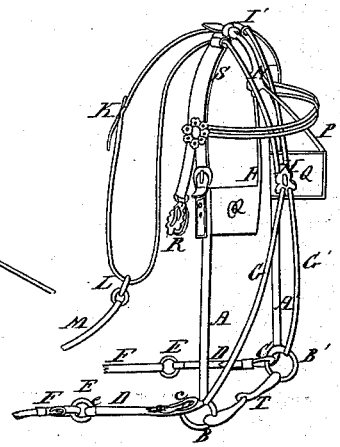
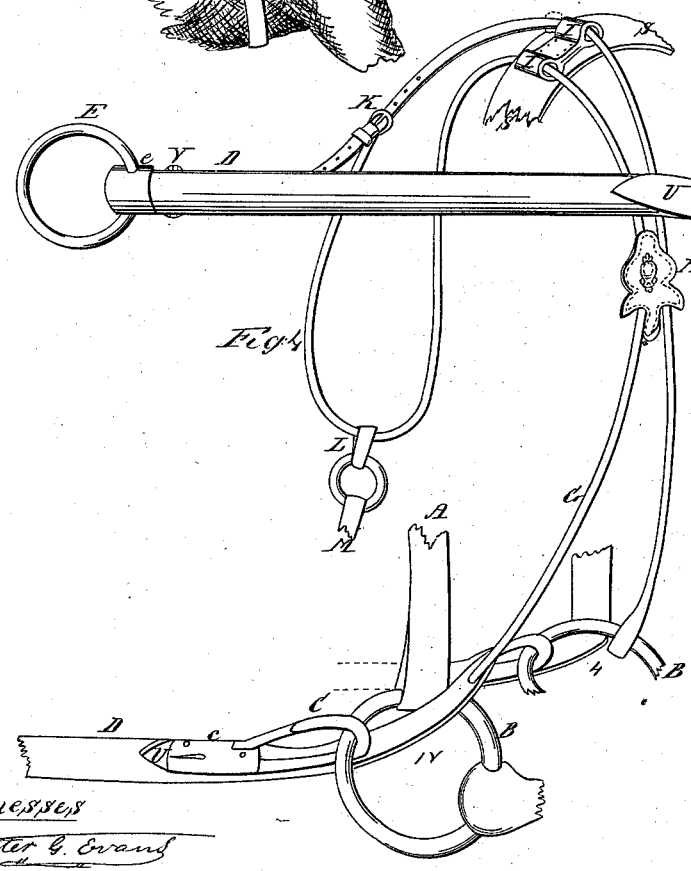
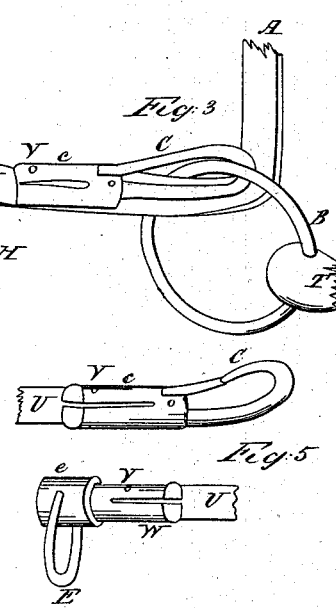
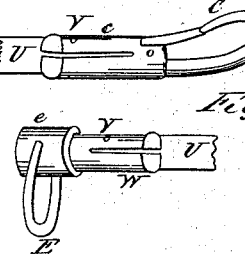
Witnesses
Walter G. Evans
Jacob Stauffer
Inventor
M. Haberbush
E. Kreckel

United States Patent Office.

IMPROVEMENT IN BRIDLES.

MICHAEL HABERBUSH AND EDWARD KRECKEL, OF LANCASTER, PENNSYLVANIA.

Letters Patent No. 59,996, dated November 27, 1866.

SPECIFICATION.

TO ALL WHOM IT MAY CONCERN:

Be it known that we, MICHAEL HABERBUSH and EDWARD KRECKEL, of Lancaster, in the county of Lancaster, and State of Pennsylvania, have invented new and useful improvements on Safety Bridles; and we do hereby declare that the following is a full, clear, and exact description of the construction and operation of the same, reference being had to the annexed drawings, making a part of this specification, in which—

Figure 1 shows a bridle with the improvements in place.

Figure 2 illustrates its application on the horse, and the effect of tension on the hitching strap, when thus applied.

Figure 3 is an enlarged view of the gum and the tubulated snap, sheathed in part by the cheek-piece, or face-piece, if preferred.

Figure 4 and IV is to illustrate both modes of connecting the snap and gum in its sheath formed by either strap.

Figure 5 shows the construction of the tubulated snap, C, and ring head, $e$, the tubes being united with them for the reception of the gum; to facilitate the insertion of the same, the tubes are slit and afterward compressed upon the gum and a rivet inserted at V. The ring head, $e$, for the outer end, is solid for the ring E, with a raised shoulder, against which the leather sheath is made to butt, giving a finish; a rivet, $v$, is then passed through the leather tube and gum and fixed by the rivet heads, firmly clamping the gum at both ends.

The object of this invention is to prevent vicious horses from breaking the hitching strap or bridle, so frequently the case, or from slipping the head out of the bridle, as some horses do, as well as to provide a neat and efficient safety bridle to meet the demand of the public, heretofore only partially met, there being objections to branching lines doubly connected, or one branch attached to a ring on the strap, the other to the ring of the bit; besides, the manner of attaching gum to leather, by sewing on, (when used,) is found to weaken the gum to such a degree as to destroy its utility in a short time. To supply these wants and obviate the various objections, has caused us much study and experimenting, but trust we have succeeded in its accomplishment.

We will now proceed to describe the construction of our bridle, so as to enable any one skilled in the art to make and use our invention.

Fig. 1 illustrates an ordinary carriage bridle, with this difference, that the cheek-piece, A A', instead of being connected to the ring of the bit, is first formed into a tubular sheath, D, and made partly to cover a cylindrical piece of gum, say seven inches long and three-fourths of an inch in diameter, marked U, secured together at its terminus by a socket head, $e$, and and ring, E. The other end of the gum cylinder is free from the strap and inserted into a tubulated snap-hook, C, so constructed, by an open slit and bevelled end, (by compression,) as to clamp and firmly hold the gum at all points within it, and then further secured by a rivet $v$. The snap itself is of the ordinary make, with the addition of a tube expressly made to receive and hold the gum firmly embraced, both to the ring head and snap, and will be rather ornamental than otherwise. The combined gum and snap in the sheathed extremity of the check-piece is now passed through the ring of the bit on each side and the lines attached to the ring E or terminus of the check-piece A, the snap is hooked into the ring of the bit, and the safety connection is completed in a neat and apparently simple piece. The operation is readily understood: a hard pull on the lines will stretch the gum and cause the unyielding leather in connection with it to draw the bit upward in the horse's mouth and bring him into submission. To prevent horses from slipping their head out of the bridle, or from breaking loose when hitched, we provide a combined throat-latch and face-piece in connection with the rings of the bit; thus to the rings B and B' rounded leather straps G G' are attached, respectively, (as shown by fig. 1.) These are brought into close proximity in the centre of the horse's face by passing them through a loop provided for each in the rear of an ornamental shield, H, or sliding piece, thence upward through rings or loops, I, centrally affixed to the crown-piece, S, provided for each. The round strap, G', is now flattened and pierced for the reception of the tongue of the buckle, K, on the extremity of the other rounded strap, G, which latter is also provided with a short strap and ring, L, affixed at a point so as to come under the throat when buckled together and forming the throat-latch, to which ring, L, the hitching strap, M, is connected. It will be seen that any pull made by the horse will necessarily draw out the throat-latch, which, by its connection (and sliding through the loops) to the bit, will draw the bit upward in the horse's mouth as effectually as when acted upon by the safety connection with the line by the driver, and thereby prevent the horse from making any serious attempt to break the strap or slip the bridle. We may observe that by connecting the cheek-pieces, A A', to the rings of the bit, instead of the face-pieces, G G', and furnishing the latter with the gum (encased in its extended end) with the snap-hook, c, attached to the ring of the bit in like manner, the same results would be obtained; it would only require a button or stop behind the loops, I, on the crown of the head, unless it would be desirable to compress the windpipe of the horse in addition to raising the bit in the mouth. Such a button or stop behind the loops, I, would not prevent the action of the hitching-strap, M L. We believe either arrangement to be good, and original with us, so far as the mode of applying a long-established principle, common to all, by means of a specific combination and adaptation to this end, is considered. We are aware that safety straps, so called, operating on the bit, are not new, and various devices employed, said strap being either independent or connected at one end to the rings of the bit and carried up over a roller and down again through the rings of the bit, and in either case terminated by a simple ring, to which the line or a branch is connected. We are also aware that a cylindrical piece of gum connected at each end with leather billets is used as a short branch fastened to the bit, in conjunction with a short leather branch united in a cap with the same at one end, and a ring for a single line, the said leather branch connected to the ring of the safety strap. There are also double lines in use, one partially encased within the other and branching in front, and severally connected to the ring of the bit and safety strap, as well as a cord or strap from the rings of the bit passing over a pulley and under the throat of the horse for compressing the windpipe; all of which devices or inventions we disclaim. The neatness and durable manner of the gum and tubular snap-connection and sheathing within and constituting a single connection of a twofold action, united by the tubulated shouldered head and ring for a single line, differs substantially from any of the other devices yet employed, and is as desirable as it is novel and useful; which, together with the combined throat-latch and face-pieces, forms the substance of our invention, including the tubulated snap and ring-head.

What we claim, and desire to secure by Letters Patent, is—

1. The construction and combination of a tubulated snap-hook C, gum, within a sheath, D, formed by the end of a continuous strap, both united and held by a socket head and ring E, jointly passed through the rings of the bit, so that the enclosed gum, with its snap, will hook into the said ring of the bit, in the manner and for the purpose specified.

We also claim the face-pieces, G G', attached to the rings of the bit, and severally passed upward through their respective loops, H I, and forming the throat-latch, K, with its hitching ring, L, all combined and arranged in the manner specified for the purpose set forth.

M. HABERBUSH,
E. KRECKEL.

Witnesses:
　WALTER G. EVANS,
　JACOB STAUFFER.